(12) United States Patent
Barbee, Jr. et al.

(10) Patent No.: US 6,396,900 B1
(45) Date of Patent: May 28, 2002

(54) MULTILAYER FILMS WITH SHARP, STABLE INTERFACES FOR USE IN EUV AND SOFT X-RAY APPLICATION

(75) Inventors: Troy W. Barbee, Jr., Palo Alto; Sasa Bajt, Livermore, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/847,744

(22) Filed: May 1, 2001

(51) Int. Cl.⁷ .................................................. G21K 1/06
(52) U.S. Cl. ........................................................ 378/84
(58) Field of Search ..................................... 378/84, 85

(56) References Cited

U.S. PATENT DOCUMENTS 5,319,695 A * 6/1994 Itoh et al. ..................... 378/85

* cited by examiner

Primary Examiner—Craig E. Church
(74) Attorney, Agent, or Firm—John P. Wooldridge; Alan H. Thompson

(57) ABSTRACT

The reflectivity and thermal stability of Mo/Si (molybdenum/silicon) multilayer films, used in soft x-ray and extreme ultraviolet region, is enhanced by deposition of a thin layer of boron carbide (e.g., $B_4C$) between alternating layers of Mo and Si. The invention is useful for reflective coatings for soft X-ray and extreme ultraviolet optics, multilayer for masks, coatings for other wavelengths and multilayers for masks that are more thermally stable than pure Mo/Si multilayers

20 Claims, 3 Drawing Sheets

MULTILAYER FILMS WITH SHARP, STABLE INTERFACES FOR USE IN EUV AND SOFT X-RAY APPLICATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to multilayer structures used in extreme ultraviolet lithography, and more specifically, it relates to an interdiffusion resisting interlayer placed between the individual layers of the multilayer structure.

2. Description of Related Art

Success of extreme ultraviolet lithography (EUVL) is highly dependant on the throughput of the lithography tools. The throughput is an integral of the reflectance and of the intensity spectrum of the source over the wavelength region of interest. The reflectance is a product of reflectance curves from all reflective mirrors in the lithography tool. For example, in a lithography machine with nine reflective mirrors the reflectance under the integral would be $R^9$. Therefore, any improvement in the reflectance leads to a substantial increase in the throughput of the lithography tool.

Mo/Si multilayers are deposited as a periodic stack of alternating Mo and Si layers. Although the reflectivity from each interface in the multilayer coating is small, the reflections from all the interfaces can interfere constructively to yield a total reflectivity of about 74% at wavelengths above Si L-edge at 12.5 nm. Mo and Si layers are separated by interlayers of a mixture of Mo and Si (amorphous molybdenum silicide) that considerably reduces the reflectivity of the coating. A practical multilayer, for example, has usually 10% (relative) lower reflectance than a multilayer with perfectly sharp interfaces. Thus, one issue is how to prevent the two materials (Mo and Si, in this case) from interdiffusing to form a compound and how to optimize the interface structure formed by inter diffusion.

U.S. Pat. No. 5,319,695, titled "Multilayer Film Reflector For Soft X-Rays" describes a soft X-ray multilayer film reflector which has a multilayer film structure formed adjacent higher and lower refractive index layers that are separated from one another by a hydrogenated interface layer that is thinner than either of the adjacent layers. The present invention separates the layers of a multilayer reflector without the use of the hydrogenated interface layer.

The other problem is that these multilayer coatings have to be thermally stable. This is especially important for multilayers used as reflective coatings on masks that undergo different etching procedures and thermal cycling. Currently, Mo/Si multilayers cannot be exposed to temperatures above 120 degrees Celsius even for a short time because the activation energy is so low that further diffusion and the growth of molybdenum silicide is inevitable. In order to keep the reflectance and the multilayer period thickness (which determines the wavelength at which these multilayer will reflect) stable one needs to find a way to increase the activation energy for diffusion of Si in Mo and Mo in Si.

SUMMARY OF THE INVENTION

It is an object of the present invention to control the interdiffusion of the two materials of an EUVL multilayer coating upon thermal processing to improve the thermal stability of Mo/Si interfaces and hence the multilayer.

It is also an object of this invention to optimize the interface structure thus optimizing performance.

These and other objects will be apparent based on the disclosure herein.

The invention is an EUVL multilayer structure formed with an interface layer placed between alternating layers of an absorber layer and a spacer layer. The interface layer comprises a material that controls interdiffusion between the absorber layer and the spacer layer. Materials usable as the interface layer include boron carbide and carbon with boron based compounds. These materials are characterized as having a low absorption of EUV and X-ray wavelengths. The present invention separates the layers of a multilayer reflector without the use of the hydrogenated interface layer.

For Mo/Si multilayers, the present inventors have discovered that the interface layer slightly reduces the formation of molybdenum silicide by the formation of a Mo, Si, B, C interfacial layer. For Mo/Si and Mo/Be multilayers, increases in the reflectance of EUV and X-ray wavelengths and increases in the thermal stability have been observed. A method for making an EUVL multilayer structure that includes the interface layer is provided as well.

DETAILED DESCRIPTION OF THE PREFERRED EMBODIMENTS

The invention provides an EUVL multilayer coating that has high reflectivity, high thermal stability and controlled reaction or interdiffusion between the two different materials at their interface. Such a multilayer consists of alternating layers of an absorber layer (e.g., molybdenum) and a spacer layer (e.g., silicon). The invention is a thin layer of a third compound, e.g., boron carbide ($B_4C$), placed on both interfaces (Mo-on-Si and Si-on-Mo interface). This third layer comprises boron carbide and other carbon and boron based compounds characterized as having a low absorption in EUV wavelengths and soft X-ray wavelengths. Thus, a multilayer film comprising alternating layers of Mo and Si includes a thin interlayer of boron carbide (e.g., $B_4C$) and/or boron based compounds between each layer. The interlayer changes the surface (interface) chemistry, resulting in an increase of the reflectance and increased thermal stability.

Figure 1:
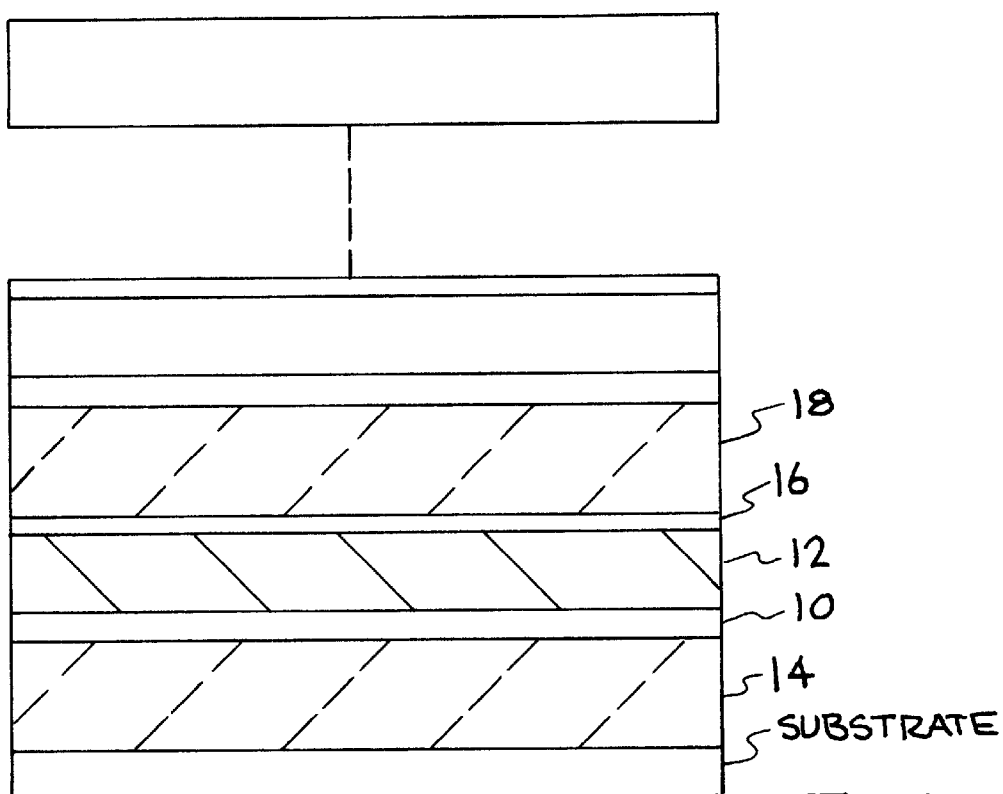
FIG. 1 shows the multilayer design of a Mo/Si multilayer with a thicker $B_4C$ layer on the Mo-on-Si interface and a thinner $B_4C$ layer on the Si-on-Mo interface.
Figure 2:
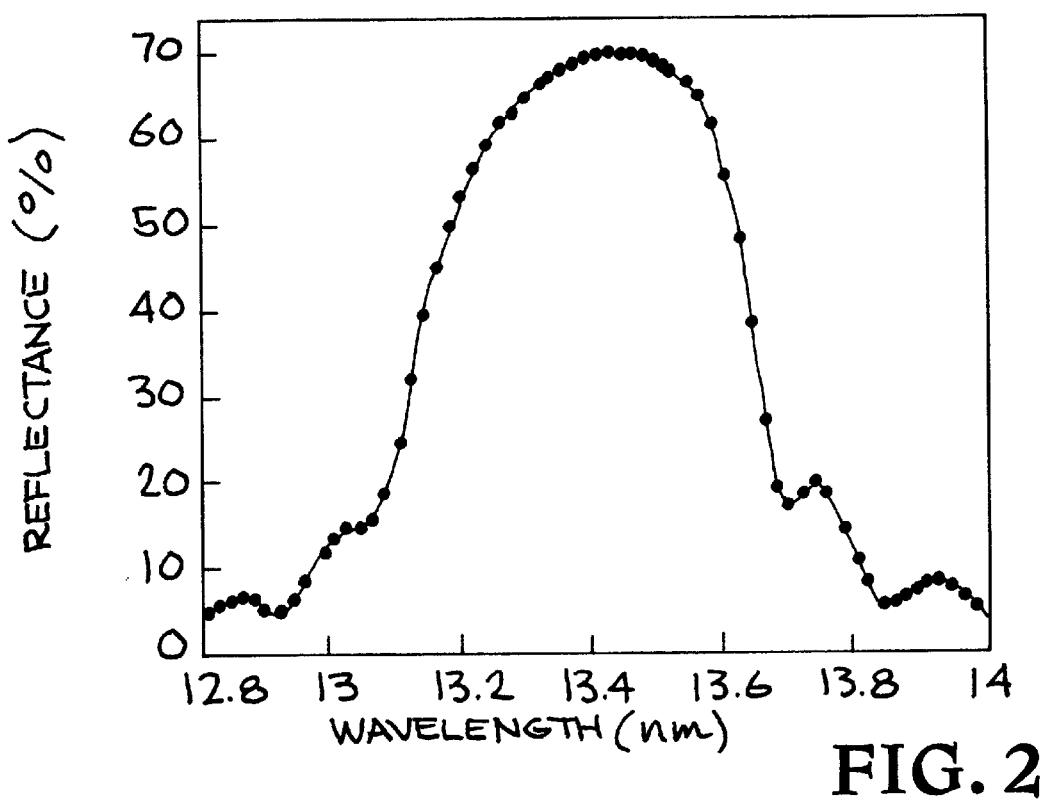
FIG. 2 shows the reflectivity of an embodiment of a multilayer structure with a diffusion controlling interlayer of the present invention

A unique feature of a Mo/Si multilayer system is that the interlayer regions are asymmetric. For example, the Mo-on-Si interface is considerably thicker than Si-on-Mo interface. This seems to be an intrinsic property of Mo/Si multilayers and has been observed in multilayers grown by magnetron sputtering [1], ion beam sputtering [2] and by electron beam evaporation [3,4]. The present invention also contemplates depositing a thicker layer of the interlayer material on the Mo-on-Si interface and a thinner layer of the interlayer material on the Si-on-Mo interface. The present inventors experimentally confirmed that a thicker boron carbide layer on the Mo-on-Si interface and a thinner layer of boron carbide on the Si-on-Mo interface gave the best reflectivity results. FIG. 1 shows multilayer design of a Mo/Si multilayer with a thicker $B_4C$ layer on the Mo-on-Si interface (where Mo is referred to as 12 and Si is referred to as 14) and a thinner $B_4C$ layer 16 on the Si-on-Mo interface (where Si is referred to as 18 and Mo is referred to as 12). The interface layer can be deposited using the same methods as for depositing Mo and Si. These methods include magnetron sputtering, ion beam sputtering, electron evaporation and any combination thereof. FIG. 2 shows the reflectance as a function of wavelength for this design, which achieved a peak reflectance of 69.9% at about 13.4 nm.

Figure 3:
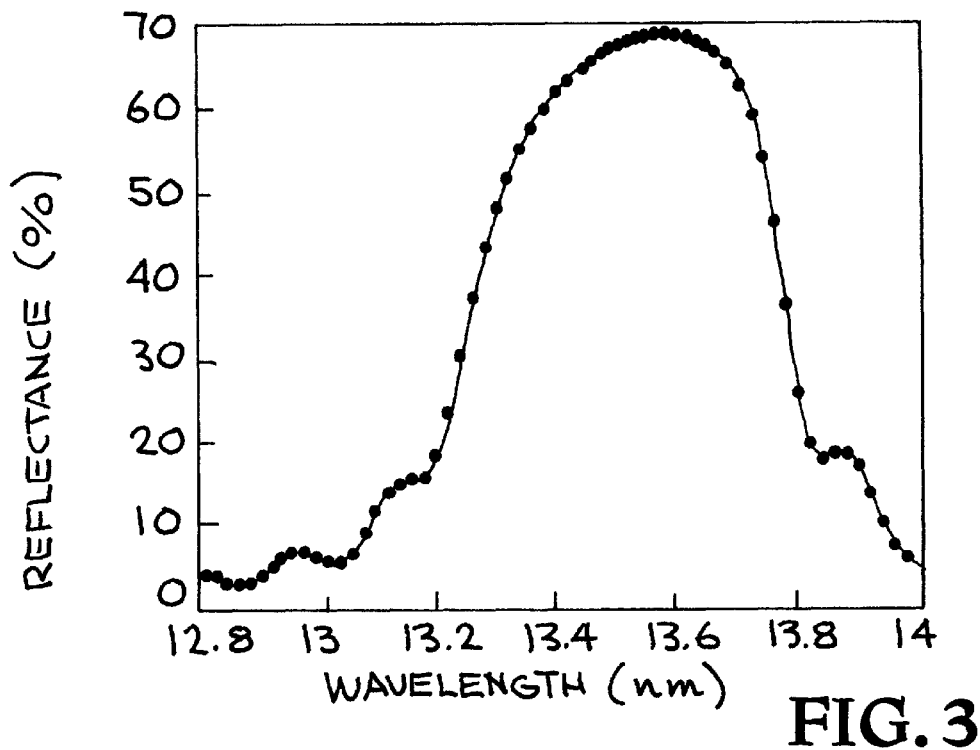
FIG. 3 shows the reflectivity of a high reflectance multilayer of the present invention, which decreased by only 0.4% (absolute) in 2.5 years.
Figure 4:
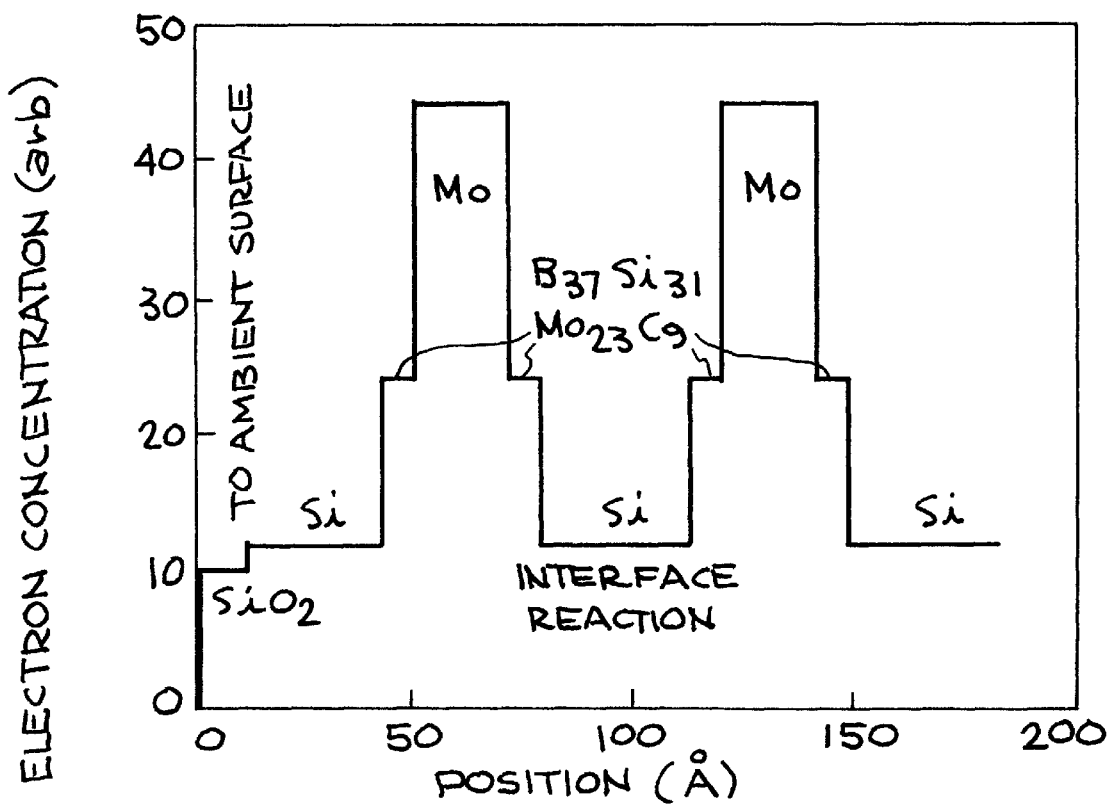
FIG. 4 shows a schematic representation of an embodiment of a multilayer structure of the present invention.

The present inventors also performed time stability testing of these multilayers. Interdiffusion in a Mo/Si multilayer was prevented by depositing $B_4C$ on the interfaces once the initial reaction from a Mo, Si, B, C amorphous layer occurred. The interfaces between the three component layers in these structures remained sharp after 2.5 years and the multilayer structure—(Mo/Mo, Si, B, C/Si/Mo, Si, B, C/ remained unchanged. The reflectivity on a high reflectance multilayer dropped by only 0.4% (absolute) in 2.5 years (FIG. 3). The observed reflectance drop is due to surface oxidation of the last Si layer that occurs within a couple of months after the deposition. This multilayer structure (Mo/Si with $B_4C$ on interfaces) is stable in reflectance as well as in wavelength over long periods of time. FIG. 4 shows a schematic representation of an embodiment of a multilayer structure of the present invention.

Figure 5:
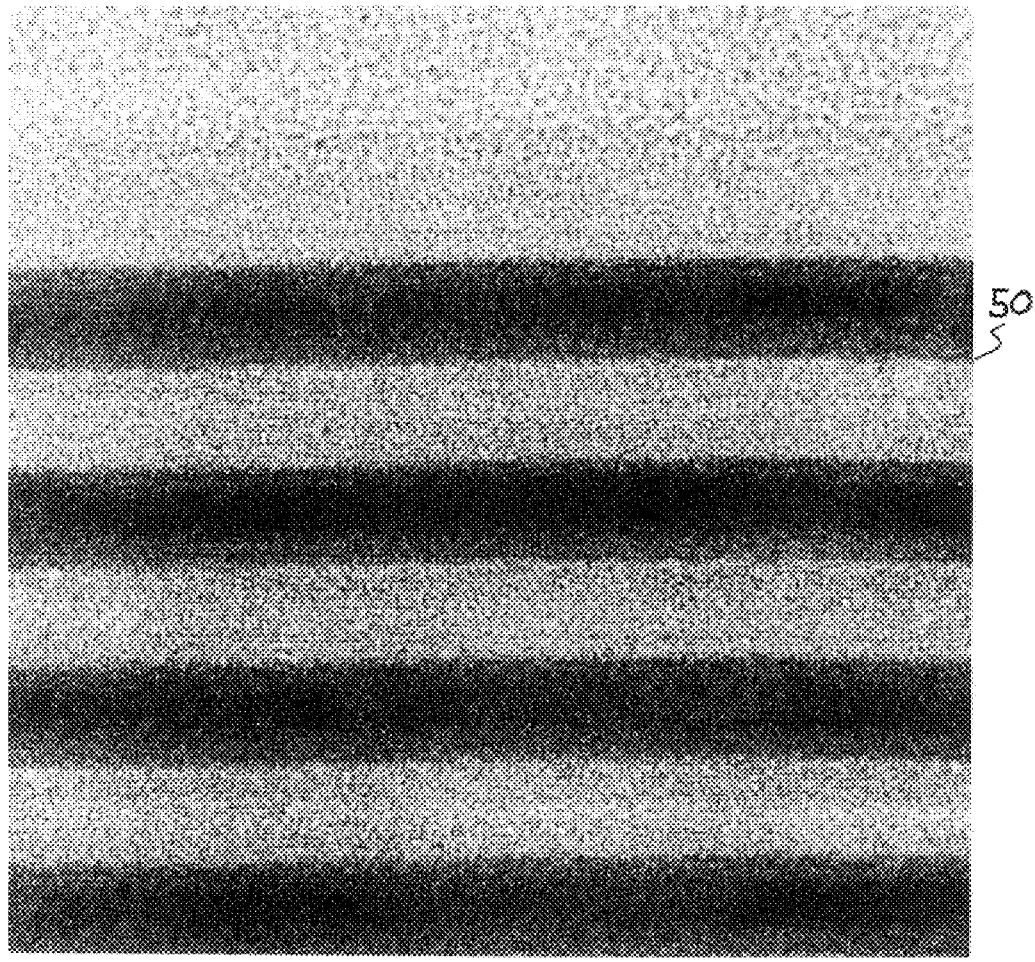
FIG. 5 shows a high magnification cross-section TEM of a Mo/B4C/Si/B4C multilayer fabricated by magnetron sputtering.

FIG. 5 shows a high magnification cross-section TEM of a Mo/B4C/Si/B4C multilayer fabricated by magnetron sputtering. The deposited thickness are: Mo=26.2 Å, Si=42.72 Å, $B_4C$=2.55/2.55 Å. The TEM thicknesses are: Mo=21.2 Å, Si=34 Å, B37Si31Mo23C9=7.35/7.35 Å. The non-crystalline reacted zones at the Mo/$B_4C$/Si interfaces are clearly shown in this magnification TEM of surface layers in the multilayer. Typically, the sharpness of the Mo on Si interface 50 would be about 2.5 times worse than that of the Si on Mo interface; however, due to the deposition of the interlayer of $B_4C$ in the Mo on Si interface, such interface sharpness is comparable to that of the Si on Mo interface. The multilayer was terminated with a Si layer that subsequently formed $SiO_2$ on the top ambient surface.

Highest reflectance multilayers are achieved with very thin $B_4C$ layers (0.1–0.35 nm). Improved lifetime stability of these multilayers can be achieved with 0.2–0.25 nm $B_4C$ thick interfaces. To make the multilayer thermally stable at higher temperatures (>300 degrees Celsius) thicker $B_4C$ layers are needed (0.3 nm or thicker). Referring again to FIG. 1, optimum performance is obtained where the thickness for the interlayer 10 is between 0.1 and 1.0 nm and interlayer 16 is between 0.1 and 0.5 nm Another important property of the multilayers is residual stress. Residual stress of Mo/Si multilayers with boron carbide interfaces is about 30% higher than the residual stress of Mo/Si multilayers with no boron carbide on the interfaces. The measured residual stress of Mo/Si multilayers with $B_4C$ interfaces is about −560 MPa. Annealing at about 150 degrees Celsius for about 3 hours reduces the residual stress substantially. The present invention contemplates that the residual stress of annealed Mo/Si multilayers with $B_4C$ interfaces is less than or equal to the residual stress of Mo/Si multilayers with no $B_4C$ on the interfaces. Still another aspect of the invention is that the annealing does not reduce the peak reflectance and does not change the peak wavelength.

References:
[1] A. K. Petford-Long, R. S. Rosen, M. B. Stearns, C. -H. Chang, S. R. Nutt, D. G. Stearns, N. M. Ceglio, and A. M. Hawryluk, J. Appl. Phys. 61, 1422, 1987.
[2] A. Ulyanenkov, R. Matsuo, K. Omote, K. Inaba, and J. Harada, J. Appl. Phys. 87,7255 (2000).
[3] J. M. Slaughter, D. W. Schulze, C. R. Hills, A. Mirone, R. Stalio, R. N. Watts, C. Tarrio, T. B. Lucatorto, M. Krumrey, P. Mueller, C. M. Falco, J. Appl. Phys. 76, 2144 (1994).
[4] M. B. Stearns, C. -H. Chang, D. G. Stearns, J. Appl. Phys. 71, 187 (1992).

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An EUVL multilayer structure, comprising:
 alternating layers of an absorber layer and a spacer layer; and
 an interface layer placed between each absorber layer and each spacer layer, wherein said interface layer comprises a material that controls interfacial reactions between said absorber layer and said spacer layer subsequent to fabrication of said multilayer, wherein said material is selected from the group consisting of boron carbide and carbon with boron based compounds.

2. The EUVL multilayer structure of claim 1, wherein said material is characterized as having a low absorption of EUV and X-ray wavelengths.

3. The EUVL multilayer structure of claim 1, wherein said absorber layer comprises molybdenum and said spacer layer comprises silicon.

4. The EUVL multilayer structure of claim 3, wherein said interface layer controls interfacial reactions, increases the reflectance of EUV and X-ray wavelengths and increases the thermal stability.

5. The EUVL multilayer structure of claim 1, wherein said introduced interface layer comprises $B_4C$.

6. The EUVL multilayer structure of claim 3, wherein the thickness of an interface layer between molybdenum on silicon has a thickness within a range from 0.1 nm to 1.0 nm and wherein an interface layer between silicon on molybdenum has a thickness within a range from 0.1 nm to 0.5 nm.

7. The EUVL multilayer structure of claim 1, wherein said absorber layer comprises molybdenum and said spacer layer comprises beryllium.

8. The EUVL multilayer structure of claim 1, wherein said interface layer results in the formation of smoother more stable interfaces between all layers of said multilayer structure as compared to a multilayer structure that does not have said interface layer.

9. A method of making an EUVL multilayer structure, comprising:
 providing alternating layers of an absorber layer and a spacer layer; and placing an interface layer between each such absorber layer and each such spacer layer, wherein said interface layer comprises a material that controls interdiffusion between said absorber layer and said spacer layer, wherein said material is selected from the group consisting of boron carbide and carbon with boron based compounds.

10. The method of claim 9, wherein said material is characterized as having a low absorption of EUV and X-ray wavelengths.

11. The method of claim 9, wherein said absorber layer comprises molybdenum and said spacer layer comprises silicon.

12. The method of claim 11, wherein said interface layer controls the formation of interfacial layers, increases the reflectance and increases thermal stability.

13. The method of claim 9, wherein said interface layer comprises $B_4C$.

14. The method of claim 11, wherein the thickness of an interface layer between molybdenum on silicon has a thickness within a range from 0.1 nm to 1.0 nm and wherein an interface layer between silicon on molybdenum has a thickness within a range from 0.1 nm to 0.5 nm.

15. The method of claim 9, wherein said interface layer is deposited using a method selected from the group consisting of magnetron sputtering, ion beam sputtering and electron evaporation.

16. The method of claim 9, further comprising annealing said multilayer structure to reduce its residual stress.

17. The method of claim 16, wherein said multilayer structure is annealed at about 150 degrees Celsius for about 3 hours.

18. The method of claim 9, wherein said interface layer results in the formation of smoother more stable interfaces between all layers said multilayer structure as compared to a multilayer structure that does not have said interface layer.

19. An EUVL multilayer structure, comprising:

alternating layers of an absorber layer and a spacer layer; and a non-hydrogenated interface layer placed between each absorber layer and each spacer layer, wherein said interface layer comprises a material that controls interfacial reactions between said absorber layer and said spacer layer subsequent to fabrication of said multilayer.

20. The EUVL multilayer structure of claim 19, wherein said material is selected from the group consisting of boron carbide and carbon with boron based compounds.

* * * * *